B. JASSEN.
AUTOMOBILE MIRROR.
APPLICATION FILED JULY 23, 1921.

1,410,186. Patented Mar. 21, 1922.

INVENTOR
BERN JASSEN
BY
ATTORNEY

UNITED STATES PATENT OFFICE.

BERN JASSEN, OF NEW YORK, N. Y.

AUTOMOBILE MIRROR.

1,410,186.   Specification of Letters Patent.   Patented Mar. 21, 1922.

Application filed July 23, 1921. Serial No. 486,931.

*To all whom it may concern:*

Be it known that BERN JASSEN, citizen of the United States, and resident of the city of New York, in the county of Kings and State of New York, has invented certain new and useful Improvements in Automobile Mirrors, of which the following is a specification.

This invention relates to automobile mirrors. One object thereof is to provide a device of the type described which may be readily attached and held in position on a wind shield or wind deflector of the vehicle.

Another object is to provide an automobile mirror which shall be capable of adjustment in various positions relative to the wind shield or deflector or other support on which it is held.

A still further object is to provide a device of the character described which shall be simple in construction and efficient in operation to a high degree.

Other objects of this invention will in part be obvious and in part hereinafter pointed out.

The invention accordingly consists in the features of construction, combinations of elements and arrangement of parts which will be exemplified in the construction hereinafter described and of which the scope of invention will be indicated in the following claims.

In the accompanying drawing, in which is shown one of various possible illustrative embodiments of this invention, Fig. 1 is a perspective view showing an embodiment of the invention in place on the wind deflector supported from the main or front wind shield of an automobile;

Figure 1:
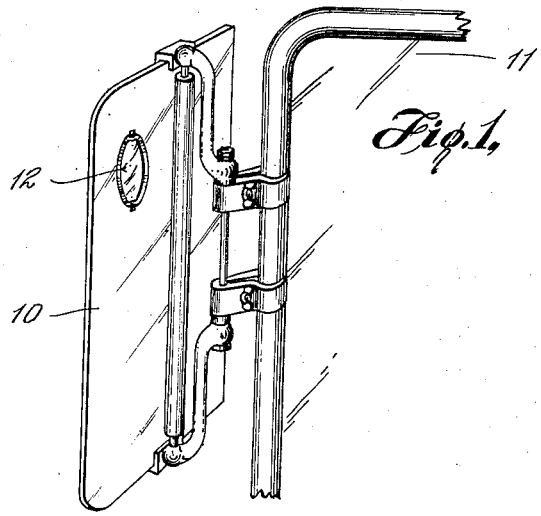

Referring in detail to the drawing, the embodiment of the invention there shown is seen as held in the wind deflector 10 supported by any suitable means from the main wind shield 11 of an automobile. The mirror as indicated at 12 is held within an opening 13 formed in the wind deflector in the manner now more fully to be described.

Figure 2:
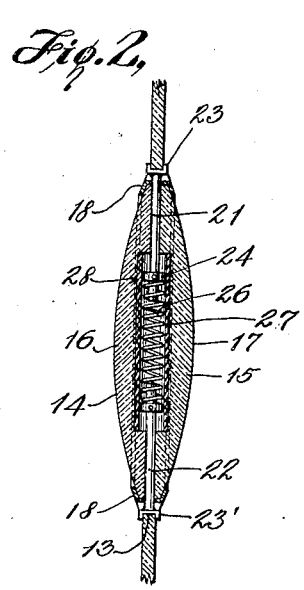
Fig. 2 is a longitudinal cross-sectional view of the mirror cut along line 2—2 of Fig. 3 showing also the means for the adjustment thereof on the wind deflector.
Figure 3:
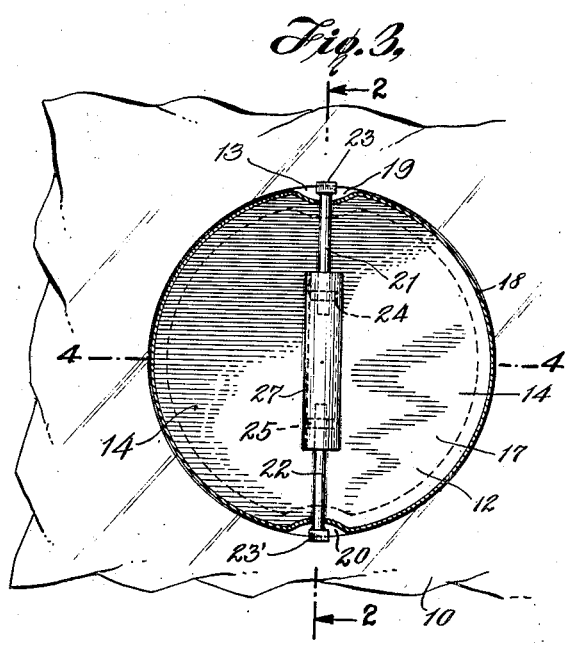
Fig. 3 is a front elevation in cross-section of the mirror in place on the wind deflector.
Figure 4:
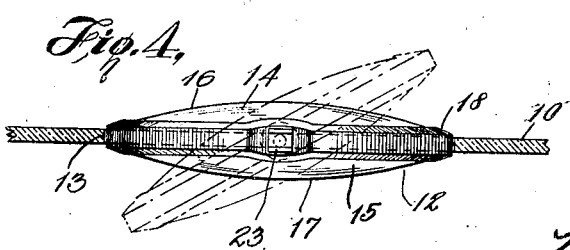
Fig. 4 is a cross-sectional view cut along line 4—4 of Fig. 2.

The mirror 12 is of two-part construction comprising the halves 14, 15, suitably held together within the bezzle or mirror frame 18. In the form shown in the drawing, the mirror surfaces are of convex curvature as shown at 16, 17, but of course any suitable or desired curvature may be employed. In the vertical diametrically opposed ends of the frame are provided openings 19, 20 wherethrough freely pass rods 21, 22 each carrying at the forward end a clamp member 23, 23' for engaging the diametrically opposed walls of the opening 13 in the glass deflector as will be clear from Figs. 2 and 3. Each of the rear ends of these rods 21, 22 is provided with a collar 24, 25 against which rests a spring member 26. This spring is housed within a tubular member 27 with which rods 21, 22 are adapted to be reciprocated, the tension of the spring being exerted against the collars 24, 25 so as to normally urge clamps 23, 23' against the opening 13, thus securely holding the mirror in position. The tubular member 27 is frictionally held within the semi-cylindrical recesses 28 cut in each of the unexposed surfaces of the mirror halves, so that when the mirror is rotated in a vertical plane, the tube rotates therewith and the whole mirror thus revolves about the rods 21, 22 as axes. It is further possible to revolve the wind deflector 10 in a vertical plane about the mirror, the latter remaining stationary by reason of the fact that the rods 21, 22 themselves are of course free to rotate within the tubular member 27. Thus the wind deflector may be placed in any position and yet the mirror retain its proper position for giving a true reflection of surrounding traffic. It is also possible to rotate the mirror in vertical plane within the opening 13 as shown in Fig. 2 merely by pushing the rods in against the spring and thus momentarily freeing the clamps and then allowing them to take hold in any other desired position as shown for example in Fig. 4, where a new position of the mirror is indicated in dotted lines.

With the construction hereinabove described, it will be evident that the mirror is always directly in view of the driver, it is easily replaced and adjusted at desired angles, and becomes part of the wind deflector, thus eliminatng separate bracket members for attachment, or other encumbrances which may impair the neatness of the machine or make necessary extra fittings and accessories.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. In an automobile mirror, the combination with a wind shield extending from the vehicle and having an opening therein, means for removably securing said mirror in position on the wind shield in the said opening, said means comprising a casing member, a resilient member placed within said casing, rod members actuated by said resilient member and extending from said casing and having jaw members adapted to engage said support.

2. In combination with an automobile wind deflector having an opening therein, an automobile mirror disposed within said opening and means for snapping said mirror in position in said opening.

3. In combination with an automobile wind deflector having an opening therein, an automobile mirror, a mirror frame adapted to receive said automobile mirror and adapted to fit within said opening, and means within said frame to fasten said mirror frame and mirror to said wind deflector.

4. In combination with an automobile wind deflector having an opening therein, an automobile frame disposed within said opening, and means for snapping the mirror in position within said opening, said means permitting the said wind deflector to be rotated in various positions independently of the mirror.

5. In combination with an automobile wind deflector having an opening therein, an automobile mirror, resilient means for removably disposing said mirror within the said opening, said means adapted to permit the rotation of the mirror either in a vertical or horizontal plane.

Signed at New York city, in the county of New York and State of New York, this 21st day of July 1921.

BERN JASSEN.